UNITED STATES PATENT OFFICE.

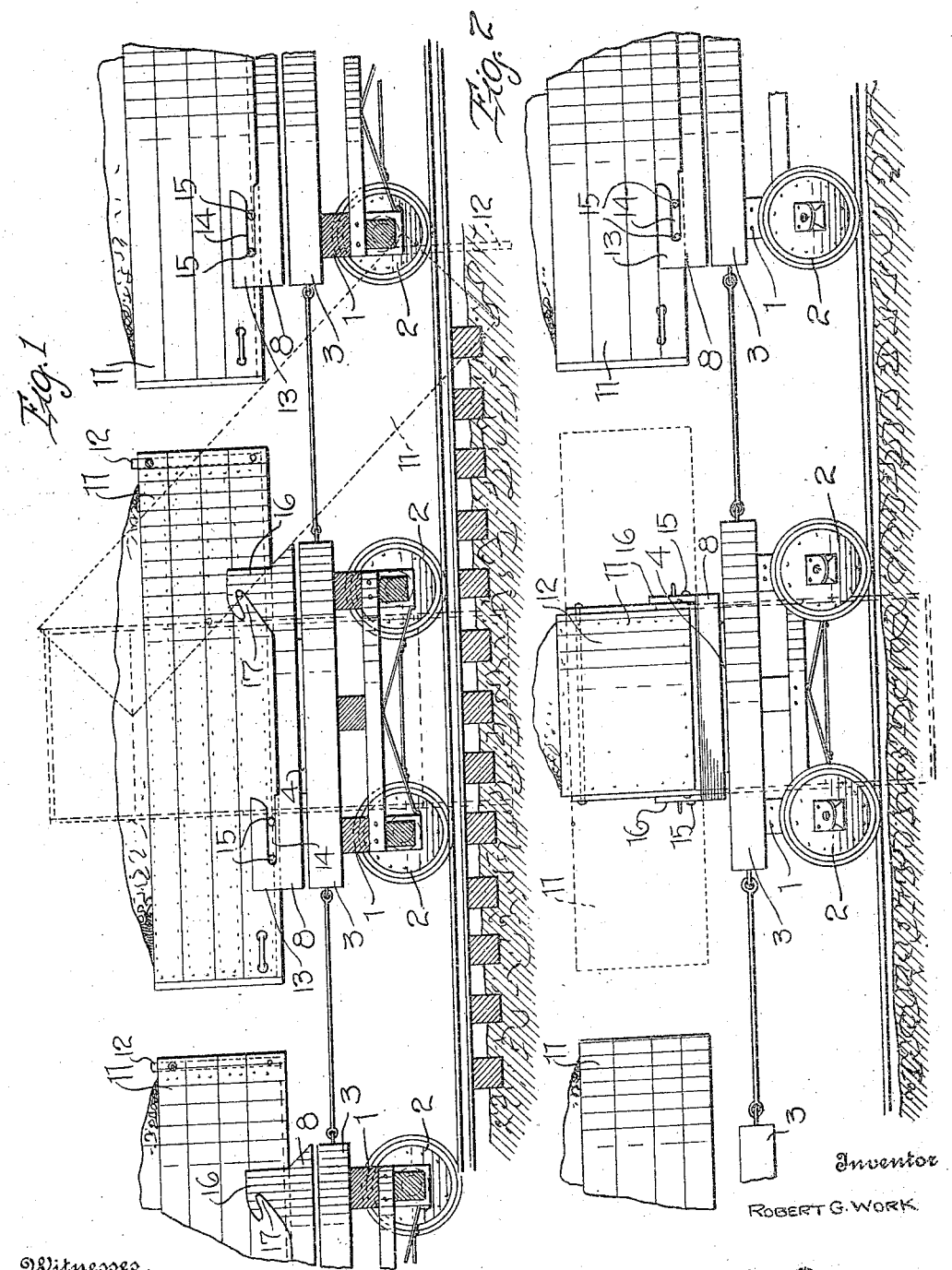

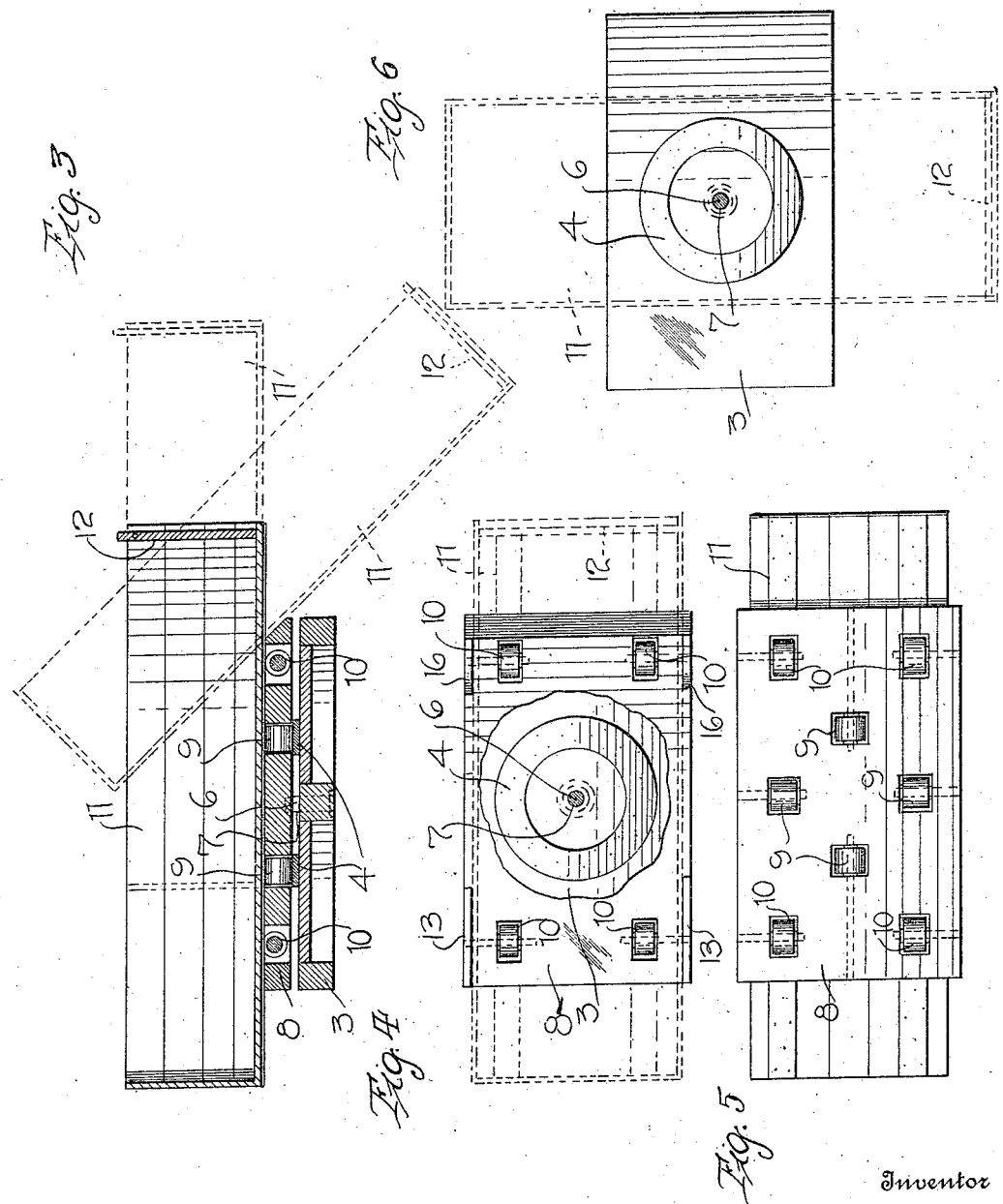

ROBERT G. WORK, OF HOMER CITY, PENNSYLVANIA.

DUMPING-CAR.

1,075,744.

Specification of Letters Patent. Patented Oct. 14, 1913.

Application filed June 14, 1913. Serial No. 773,725.

*To all whom it may concern:*

Be it known that I, ROBERT G. WORK, a citizen of the United States, residing at Homer City, in the county of Indiana and State of Pennsylvania, have invented certain new and useful Improvements in Dumping-Cars, of which the following is a specification, reference being had to the accompanying drawings.

This invention relates to new and useful improvements in dumping cars and more particularly to a dumping car which is especially adapted for use in mines and like places, the object of the invention being to provide a dumping car which can be quickly and readily loaded and transported from place to place and readily emptied of its contents, the body of the car being swung to the desired position before dumping.

Another object of the invention is to provide a dumping car of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 1 is a side elevation illustrating a number of my improved dumping cars coupled together and illustrating in dotted lines various positions the car occupies when in its operative position. Fig. 2 is a similar view illustrating the body of one of the cars being disposed at right angles with respect to the truck thereof; Fig. 3 is a central longitudinal sectional view; Fig. 4 is a top plan view, parts being broken away; Fig. 5 is a bottom plan view; Fig. 6 is a top plan view of the platform of the car.

Referring more particularly to the drawings, 1 indicates the truck of the car which is movably supported by means of the wheels 2 and secured to the upper surface of the truck 1 is a platform 3. Mounted upon the platform and arranged centrally thereof is a circular track 4 which is arranged around a central opening 5 formed in the platform 3 and through which projects a pivot pin 6.

Rotatably mounted upon the platform 3 and provided with a central opening 7 adapted for the reception of the upper end of the pin 6 is a carriage 8 which is preferably to be of the same shape and size, as the platform 3. Rotatably mounted in the body portion of the carriage are the circularly arranged rollers 9 which are adapted to engage with the circular track 4 upon the rotation of the carriage 8. The carriage is further provided at each corner thereof with the rollers 10 which are adapted to engage with the under surface of the body 11 of the car whereby said body may be moved with respect to the carriage 8. From this it will be seen that through the medium of the rollers 9, the carriage 8 may be readily rotated upon the platform 3 and through the medium of the rollers 10, the body 11 of the car may be moved from one end of the carriage 8 to the other and adapted to occupy the positions illustrated in dotted lines in Figs. 1 and 3. The body 11 of the car is provided at one end with a movable gate 12 which may be quickly and readily raised to empty the contents of the car when the body of the same has been disposed to the position shown by the dotted lines in Figs. 1 and 3.

The carriage 8 is provided at one end upon opposite sides thereof with the upwardly projecting ears 13 which are bifurcated to form the elongated open ended slots 14 which are adapted to normally receive the spaced lugs 15 formed upon opposite sides of the body 11 and arranged adjacent one end thereof. The carriage 8 is further provided at its end opposite the ears 13 with the upwardly projecting ears 16 having the inclined recesses 17 formed in the inner face thereof and which are adapted to receive one of the lugs 15 when the car is moved to its operative position, as illustrated in the dotted lines in Figs. 1 and 3. From this it will be seen that by having the lugs 15 normally disposed within the slots 14, the body of the car is securely held against any tilting movement whatever and it will be apparent from the above description taken in connection with the accompanying drawings that when the car is being loaded the central portion of the body 11 will be disposed directly above the central portion of the platform 3, thus throwing the entire weight of the car upon the platform. Furthermore it will be apparent that when it is desired to empty the body 11 of its contents, the same will be moved longitudinally upon the rollers 10 until one of the lugs 15 engage within the slot 17. The body of the car is then swung and disposed to any desired position and then tilted, the gate 12 being removed to permit the contents of the body to be emptied.

It will be readily understood from the above description taken in connection with the accompanying drawings that any suitable number of cars may be coupled together and the operation of emptying one car will not in any way affect the operation of the car next to it.

The practical operation of my improved dumping car will be readily understood with the above description taken in connection with the accompanying drawings. It will also be apparent that after the car has been loaded and transported to any desired place, the same can be quickly and readily dumped of its contents by first rotating the carriage 8 so that the body 11 may be readily moved longitudinally with respect to the platform. After the car has been moved longitudinally so that one of the lugs 15 will engage with the ears 16, the body of the car is tilted and the gate 12 removed so that the contents of the car will be quickly withdrawn therefrom. The body may then be pushed back to its normal position and the carriage rotated until the body of the car is arranged in alinement with the platform 3. From this it will be seen that each car may be quickly and readily emptied of its contents and returned to its normal position without interfering with the car in the rear or in advance.

From this it will be seen that I have provided a simple and durable dumping car which is especially adapted for use around mines and the like for conveying iron, coal and the like from the mines and the smelters, etc., and readily emptying the same of their contents. It will also be apparent that these grooves are extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features of construction or departing from the scope of the appended claims.

Having thus described this invention, what is claimed is:—

1. A device of the class described including a wheeled truck having a platform, a circular track arranged centrally upon said platform, a carriage mounted upon the platform and provided with a plurality of circularly arranged rollers, adapted to run upon said track, a second set of rollers arranged at each end of the carriage, and a body member mounted upon the second set of rollers for sliding and tilting movement.

2. A device of the class described including a wheeled truck, having a platform, a circular track mounted upon said platform, a carriage having centrally arranged rollers adapted to run upon said track, whereby the carriage may be readily rotated, a pivot pin carried by the platform and engaging said carriage, a second set of rollers arranged at each end of the carriage, a body member slidably mounted upon the second set of rollers, spaced ears arranged at one end of the carriage, said ears being provided with an open ended slot, spaced lugs carried by the body and normally arranged within said slots, and a second set of ears arranged at the opposite end of the carriage and adapted for engagement with one of the lugs, upon the tilting movement of the body.

In testimony whereof I hereunto affix my signature in the presence of two witnesses.

ROBERT G. WORK.

Witnesses:
 JOHN M. LUCAS,
 GEO. H. KELLY.

---

Copies of this patent may be obtained for five cents each, by addressing the "Commissioner of Patents, Washington, D. C."